US010524172B2

(12) United States Patent
Zheng et al.

(10) Patent No.: US 10,524,172 B2
(45) Date of Patent: Dec. 31, 2019

(54) USER EQUIPMENT AND NETWORK ACCESS METHOD

(71) Applicant: HUAWEI TECHNOLOGIES CO., LTD., Shenzhen (CN)

(72) Inventors: Xiaoxiao Zheng, Shanghai (CN); Xiaoying Xu, Shanghai (CN); Lingli Pang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/834,078

(22) Filed: Dec. 7, 2017

(65) Prior Publication Data

US 2018/0109982 A1    Apr. 19, 2018

Related U.S. Application Data

(63) Continuation of application No. PCT/CN2015/081275, filed on Jun. 11, 2015.

(51) Int. Cl.
*H04W 36/00* (2009.01)
*H04W 24/10* (2009.01)
(Continued)

(52) U.S. Cl.
CPC ....... *H04W 36/0083* (2013.01); *H04W 24/10* (2013.01); *H04W 48/16* (2013.01);
(Continued)

(58) Field of Classification Search
CPC . H04W 36/0083; H04W 76/18; H04W 24/10; H04W 48/16; H04W 48/20
See application file for complete search history.

(56) References Cited

U.S. PATENT DOCUMENTS

2007/0124449 A1* 5/2007 Kang ................... G06F 15/173
2007/0275717 A1* 11/2007 Edge ...................... H04Q 7/20
(Continued)

FOREIGN PATENT DOCUMENTS

CN      101132602 A      2/2008
CN      101505514 A      8/2009
(Continued)

OTHER PUBLICATIONS

3GPP TS 36.331 V12.5.0 (Mar. 2015),3rd Generation Partnership Project;Technical Specification Group Radio Access Network;Evolved Universal Terrestrial Radio Access (E-UTRA);Radio Resource Control (RRC);Protocol specification (Release 12),total 445 pages.

*Primary Examiner* — Ronald B Abelson
(74) *Attorney, Agent, or Firm* — Kilpatrick Townsend & Stockton LLP

(57) ABSTRACT

The present invention relates to the communications field, and discloses user equipment and a network access method, so as to resolve a problem of service transmission interruption caused by a relatively long time for UE to access a network again after the UE fails to access a network or detects an RLF or an HOF in a current cell. In a specific solution, an obtaining unit obtains access information for accessing a network in a first cell, and the first cell is a cell included in a list pre-stored on the UE. A storage unit stores the access information obtained by the obtaining unit. A determining unit determines that accessing a network in the first cell is required. An access unit accesses a network in the first cell according to the access information stored in the storage unit.

16 Claims, 3 Drawing Sheets

(51) Int. Cl.
*H04W 48/16* (2009.01)
*H04W 48/20* (2009.01)
*H04W 76/18* (2018.01)
*H04W 88/02* (2009.01)

(52) U.S. Cl.
CPC ........... *H04W 48/20* (2013.01); *H04W 76/18* (2018.02); *H04W 88/02* (2013.01)

(56) References Cited

U.S. PATENT DOCUMENTS

| | | |
|---|---|---|
| 2008/0253332 A1 | 10/2008 | Ore et al. |
| 2011/0199950 A1 | 8/2011 | Klingenbrunn et al. |
| 2012/0157102 A1 | 6/2012 | Yang |
| 2013/0059587 A1 | 3/2013 | Lindoff et al. |
| 2014/0133465 A1 | 5/2014 | Johansson et al. |

FOREIGN PATENT DOCUMENTS

| | | |
|---|---|---|
| CN | 101669385 A | 3/2010 |
| CN | 101873653 A | 10/2010 |
| CN | 102754484 A | 10/2012 |
| CN | 103582084 A | 2/2014 |

* cited by examiner

USER EQUIPMENT AND NETWORK ACCESS METHOD

CROSS-REFERENCE TO RELATED APPLICATIONS

This application is a continuation of International Application No. PCT/CN2015/081275, filed on Jun. 11, 2015, the disclosure of which is hereby incorporated by reference in its entirety.

TECHNICAL FIELD

The present invention relates to the communications field, and in particular, to user equipment and a network access method.

BACKGROUND

In the prior art, when user equipment (UE) needs to communicate, in a current camped-on cell, with a network device, the user equipment first needs to apply to the network device for a dedicated resource in a random access process, and then establishes a signaling connection to the network device by using the dedicated resource after successfully obtaining the dedicated resource by application, so as to successfully access a network, and further communicate, in the current camped-on cell, with the network device. However, when physical random access channel (PRACH) resources are strained, or dedicated resources are strained, or network load is relatively high, UE cannot successfully access a network. In this case, the UE needs to reselect a new cell to camp on, and first obtains a system information block (SIB) of the new cell; then re-initiates a random access process in the new cell according to the obtained SIB, so as to access a network again; and communicates, in the new cell, with a network device after successfully accessing a network.

In addition, in a process in which UE successfully accesses a network in a current camped-on cell and performs data transmission, if the UE detects a radio link failure (RLF) or a handover failure (HOF) in the current cell, the UE also needs to reselect a new cell to camp on, and first obtains a SIB of the new cell; and then re-initiates a random access process in the new cell according to the obtained SIB, so as to access a network again, and further recover data transmission.

In the prior art, at least the following problem exists: When UE fails to access a network or detects an RLF or an HOF in a current cell, the UE first needs to obtain a SIB of a new cell, and then can access a network again according to the obtained SIB. However, generally, it takes a relatively long time for UE to obtain a SIB. Consequently, after UE fails to access a network or detects an RLF or an HOF in a current cell, it needs to take a relatively long time for the UE to access a network again, and service transmission is interrupted.

SUMMARY

Multiple aspects of the present invention provide user equipment and a network access method, so as to resolve a problem of service transmission interruption caused by a relatively long time for UE to access a network again after the UE fails to access a network or detects an RLF or an HOF in a current cell.

A first aspect of the present invention provides user equipment (UE), including: an obtaining unit, configured to obtain access information for accessing a network in a first cell, where the first cell is a cell included in a list pre-stored on the UE; a storage unit, configured to store the access information obtained by the obtaining unit; a determining unit, configured to determine that accessing a network in the first cell is required; and an access unit, configured to access a network in the first cell according to the access information stored in the storage unit.

With reference to the first aspect, in a first possible implementation, the UE further includes: a measurement unit, configured to: before the obtaining unit obtains the access information for accessing a network in the first cell, measure signal quality of the first cell according to instruction information that is carried in configuration information sent by a network device, to obtain a first measurement result, where the instruction information is used to instruct to measure the signal quality of the first cell; and the obtaining unit is specifically configured to obtain the access information when the first measurement result obtained by the measurement unit is greater than a preset threshold carried in the configuration information.

With reference to the first aspect or the foregoing possible implementation, in another possible implementation, the obtaining unit is specifically configured to: receive the access information that is sent by a network device by using a system broadcast message; or receive the access information that is sent by a network device by using a dedicated radio resource control (RRC) message; or receive the access information that is sent by a network device by using a paging message.

With reference to the first aspect or the foregoing possible implementation, in another possible implementation, the obtaining unit is specifically configured to: before the UE is located in a current cell and when the UE was located in the first cell, receive the access information that is sent by a network device by using a system broadcast message; or before the UE is located in a current cell and when the UE was located in the first cell, receive the access information that is sent by a network device by using a dedicated RRC message; or before the UE is located in a current cell and when the UE was located in the first cell, receive the access information that is sent by a network device by using a paging message.

With reference to the first aspect or the foregoing possible implementations, in another possible implementation, the measurement unit is configured to: before the access unit accesses a network in the first cell according to the stored access information, measure the signal quality of the first cell according to the instruction information that is carried in the configuration information sent by the network device, to obtain a second measurement result; and the determining unit is further configured to determine that the second measurement result obtained by the measurement unit is greater than the preset threshold carried in the configuration information.

With reference to the first aspect or the foregoing possible implementation, in another possible implementation, the storage unit is further configured to: after the measurement unit measures the signal quality of the first cell according to the instruction information that is carried in the configuration information sent by the network device, to obtain the first measurement result, store the first measurement result; the UE further includes: a start unit, configured to start a first timer, where an expiration time of the first timer indicates an effective time of the first measurement result; and the determining unit is further configured to: before the access unit accesses a network in the first cell according to the stored access information, determine that the first timer started by the start unit has not expired.

With reference to the first aspect or the foregoing possible implementation, in another possible implementation, the measurement unit is further configured to: when the first timer started by the start unit has expired, measure again the signal quality of the first cell according to the instruction information, to obtain a third measurement result; and the access unit is further configured to: when the third measurement result obtained by the measurement unit is greater than the preset threshold, access a network in the first cell according to the stored access information.

With reference to the first aspect or the foregoing possible implementations, in another possible implementation, the start unit is further configured to start a second timer after the obtaining unit obtains the access information for accessing a network in the first cell and the storage unit stores the access information, where an expiration time of the second timer indicates an effective time of the access information; and the access unit is specifically configured to: when the second timer started by the start unit has not expired, access a network in the first cell according to the stored access information.

With reference to the first aspect or the foregoing possible implementations, in another possible implementation, the access information obtained by the obtaining unit includes an remaining effective time of the access information; and the access unit is specifically configured to: when the remaining effective time of the access information is not 0, access a network in the first cell according to the stored access information.

With reference to the first aspect or the foregoing possible implementations, in another possible implementation, the determining unit is specifically configured to: determine that after a preamble message or a layer 3 message is sent to the network device, a response message sent by the network device is not received; or determine that after a preamble message or a layer 3 message is sent to the network device, a response denial message sent by the network device is received; or detect a radio link failure (RLF) or a handover failure (HOF) in the current cell.

With reference to the first aspect or the foregoing possible implementations, in another possible implementation, the obtaining unit is specifically configured to obtain the access information by using an idle radio frequency (RF) resource.

With reference to the first aspect or the foregoing possible implementations, in another possible implementation, the measurement unit is specifically configured to measure, according to the instruction information carried in the configuration information, the signal quality of the first cell by using the idle RF resource, to obtain the first measurement result.

A second aspect of the present invention provides a network access method, including: obtaining, by user equipment (UE), access information for accessing a network in a first cell, and storing the access information, where the first cell is a cell included in a list pre-stored on the UE; determining, by the UE, that accessing a network in the first cell is required; and accessing, by the UE, a network in the first cell according to the stored access information.

With reference to the second aspect, in a first possible implementation, before the obtaining, by user equipment (UE), access information for accessing a network in a first cell, the method further includes: measuring, by the UE, signal quality of the first cell according to instruction information that is carried in configuration information sent by a network device, to obtain a first measurement result, where the instruction information is used to instruct to measure the signal quality of the first cell; and the obtaining, by user equipment (UE), access information for accessing a network in a first cell includes: obtaining, by the UE, the access information when the UE determines that the first measurement result is greater than a preset threshold carried in the configuration information.

With reference to the second aspect or the foregoing possible implementation, in another possible implementation, the obtaining, by user equipment (UE), access information for accessing a network in a first cell includes: receiving, by the UE, the access information that is sent by a network device by using a system broadcast message; or receiving, by the UE, the access information that is sent by a network device by using a dedicated radio resource control (RRC) message; or receiving, by the UE, the access information that is sent by a network device by using a paging message.

With reference to the second aspect or the foregoing possible implementation, in another possible implementation, the obtaining, by user equipment (UE), access information for accessing a network in a first cell includes: before the UE is located in a current cell and when the UE was located in the first cell, receiving, by the UE, the access information that is sent by a network device by using a system broadcast message; or before the UE is located in a current cell and when the UE was located in the first cell, receiving, by the UE, the access information that is sent by a network device by using a dedicated RRC message; or before the UE is located in a current cell and when the UE was located in the first cell, receiving, by the UE, the access information that is sent by a network device by using a paging message.

With reference to the second aspect or the foregoing possible implementations, in another possible implementation, before the accessing, by the UE, a network in the first cell according to the stored access information, the method further includes: measuring, by the UE, the signal quality of the first cell according to the instruction information that is carried in the configuration information sent by the network device, to obtain a second measurement result; and determining that the second measurement result is greater than the preset threshold carried in the configuration information.

With reference to the second aspect or the foregoing possible implementation, in another possible implementation, after the measuring, by the UE, signal quality of the first cell according to instruction information that is carried in configuration information sent by a network device, to obtain a first measurement result, the method further includes: storing, by the UE, the first measurement result, and starting a first timer, where an expiration time of the first timer indicates an effective time of the first measurement result; and before the accessing, by the UE, a network in the first cell according to the stored access information, the method further includes: determining, by the UE, that the first timer has not expired.

With reference to the second aspect or the foregoing possible implementation, in another possible implementation, the method further includes: when determining that the first timer has expired, measuring again, by the UE, the signal quality of the first cell according to the instruction information, to obtain a third measurement result; and when determining that the third measurement result is greater than the preset threshold, accessing a network in the first cell according to the stored access information.

With reference to the second aspect or the foregoing possible implementations, in another possible implementation, after the obtaining, by user equipment (UE), access information for accessing a network in a first cell, and storing the access information, the method further includes: starting, by the UE, a second timer, where an expiration time of the second timer indicates an effective time of the access information; and the accessing, by the UE, a network in the first cell according to the stored access information includes: when determining that the second timer has not expired, accessing, by the UE, a network in the first cell according to the stored access information.

With reference to the second aspect or the foregoing possible implementations, in another possible implementation, the access information includes an remaining effective time of the access information; and the accessing, by the UE, a network in the first cell according to the stored access information includes: when determining that the remaining effective time of the access information is not 0, accessing, by the UE, a network in the first cell according to the stored access information.

With reference to the second aspect or the foregoing possible implementations, in another possible implementation, the determining, by the UE, that accessing a network in the first cell is required includes: determining, by the UE, that after a preamble message or a layer 3 message is sent to the network device, a response message sent by the network device is not received; or determining, by the UE, that after a preamble message or a layer 3 message is sent to the network device, a response denial message sent by the network device is received; or detecting, by the UE, a radio link failure (RLF) or a handover failure (HOF) in the current cell.

With reference to the second aspect or the foregoing possible implementations, in another possible implementation, the obtaining, by user equipment (UE), access information for accessing a network in a first cell includes: obtaining, by the UE, the access information by using an idle radio frequency (RF) resource.

With reference to the second aspect or the foregoing possible implementations, in another possible implementation, the measuring, by the UE, signal quality of the first cell according to instruction information that is carried in configuration information sent by a network device, to obtain a first measurement result includes: measuring, by the UE according to the instruction information carried in the configuration information, the signal quality of the first cell by using the idle RF resource, to obtain the first measurement result.

A third aspect of the present invention provides user equipment (UE), including: a receiver, configured to receive access information for accessing a network in a first cell, where the first cell is a cell included in a list pre-stored on the UE; a memory, configured to store the access information received by the receiver; and a processor, configured to determine that accessing a network in the first cell is required, and access a network in the first cell according to the access information stored in the memory.

With reference to the third aspect, in a possible implementation, the processor is further configured to: before the receiver receives the access information for accessing a network in the first cell, measure signal quality of the first cell according to instruction information that is carried in configuration information sent by a network device, to obtain a first measurement result, where the instruction information is used to instruct to measure the signal quality of the first cell; and the receiver is specifically configured to receive the access information when the first measurement result is greater than a preset threshold carried in the configuration information.

With reference to the third aspect or the foregoing possible implementation, in another possible implementation, the receiver is specifically configured to receive the access information that is sent by a network device by using a system broadcast message; or receive the access information that is sent by a network device by using a dedicated radio resource control (RRC) message; or receive the access information that is sent by a network device by using a paging message.

With reference to the third aspect or the foregoing possible implementation, in another possible implementation, the receiver is specifically configured to: before the UE is located in a current cell and when the UE was located in the first cell, receive the access information that is sent by a network device by using a system broadcast message; or before the UE is located in a current cell and when the UE was located in the first cell, receive the access information that is sent by a network device by using a dedicated RRC message; or before the UE is located in a current cell and when the UE was located in the first cell, receive the access information that is sent by a network device by using a paging message.

With reference to the third aspect or the foregoing possible implementations, in another possible implementation, the processor is further configured to: before accessing a network in the first cell according to the stored access information, measure the signal quality of the first cell according to the instruction information that is carried in the configuration information sent by the network device, to obtain a second measurement result; and determine that the second measurement result is greater than the preset threshold carried in the configuration information.

With reference to the third aspect or the foregoing possible implementation, in another possible implementation, the memory is further configured to: after the processor measures the signal quality of the first cell according to the instruction information that is carried in the configuration information sent by the network device, to obtain the first measurement result, store the first measurement result; and the processor is further configured to: start a first timer, where an expiration time of the first timer indicates an effective time of the first measurement result; and before accessing a network in the first cell according to the stored access information, determine that the first timer has not expired.

With reference to the third aspect or the foregoing possible implementation, in another possible implementation, the processor is further configured to: when determining that the first timer has expired, measure again the signal quality of the first cell according to the instruction information, to obtain a third measurement result; and when determining that the third measurement result is greater than the preset threshold, access a network in the first cell according to the stored access information.

With reference to the third aspect or the foregoing possible implementations, in another possible implementation, the processor is further configured to start a second timer after the receiver receives the access information for accessing a network in the first cell and the memory stores the access information, where an expiration time of the second timer indicates an effective time of the access information; and the processor is specifically configured to: when determining that the second timer has not expired, access a network in the first cell according to the stored access information.

With reference to the third aspect or the foregoing possible implementations, in another possible implementation, the access information obtained by the processor includes an remaining effective time of the access information; and the processor is specifically configured to: when determining that the remaining effective time of the access information is not 0, access a network in the first cell according to the stored access information.

With reference to the third aspect or the foregoing possible implementations, in another possible implementation, the processor is specifically configured to: determine that after a preamble message or a layer 3 message is sent to the network device, a response message sent by the network device is not received; or determine that after a preamble message or a layer 3 message is sent to the network device, a response denial message sent by the network device is received; or detect a radio link failure (RLF) or a handover failure (HOF) in the current cell.

With reference to the third aspect or the foregoing possible implementations, in another possible implementation, the processor is specifically configured to obtain the access information by using an idle radio frequency (RF) resource.

With reference to the third aspect or the foregoing possible implementations, in another possible implementation, the processor is specifically configured to measure, according to the instruction information carried in the configuration information, the signal quality of the first cell by using the idle RF resource, to obtain the first measurement result.

According to the foregoing described user equipment and network access method, UE obtains, in advance, access information for accessing a network in a related cell (a cell included in a list pre-stored on the UE), and stores the obtained access information. Therefore, when determining that accessing a network in a first cell is required, the UE can rapidly access a network in the first cell according to the stored access information, thereby reducing a time of accessing a network again after the UE fails to access a network or detects an RLF or an HOF in a current cell, further resolving a problem of service transmission interruption, and improving user experience.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
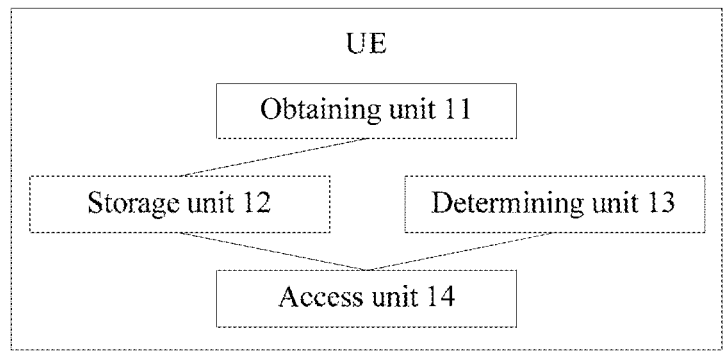
FIG. 1 is a schematic structural diagram of UE according to an embodiment of the present invention.

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the scope of the present invention.

Technologies described in this specification may be applied to various communications systems, for example, current 2G and 3G communications systems and a next-generation communications system, for example, a global system for mobile communications (GSM) system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, and other communications systems.

Various aspects are described in this specification with reference to a terminal and/or a base station and/or a base station node.

The user equipment may be a wireless terminal or a wired terminal. The wireless terminal may be a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal), a user agent, or user equipment.

The base station (for example, an access point) may be a device in communication with a wireless terminal by using one or more sectors at an air interface in an access network. The base station may be configured to mutually convert a received over-the-air frame and an IP packet and serve as a router between the wireless terminal and a rest portion of the access network, where the rest portion of the access network may include an Internet Protocol (IP) network. The base station may coordinate attribute management of the air interface. For example, the base station may be a base transceiver station (BTS) in GSM or CDMA, may be a NodeB in WCDMA, or may be an evolved NodeB (eNB, or e-NodeB) in LTE. This is not limited in this application.

In addition, the terms "system" and "network" may be used interchangeably in this specification.

An embodiment of the present invention provides UE. As shown in FIG. 1, the UE may include: an obtaining unit 11, a storage unit 12, a determining unit 13, and an access unit 14.

The obtaining unit 11 is configured to obtain access information for accessing a network in a first cell, where the first cell is a cell included in a list pre-stored on the UE.

The storage unit 12 is configured to store the access information obtained by the obtaining unit 11.

The determining unit 13 is configured to determine that accessing a network in the first cell is required.

The access unit 14 is configured to access a network in the first cell according to the access information stored in the storage unit 12.

Figure 2:
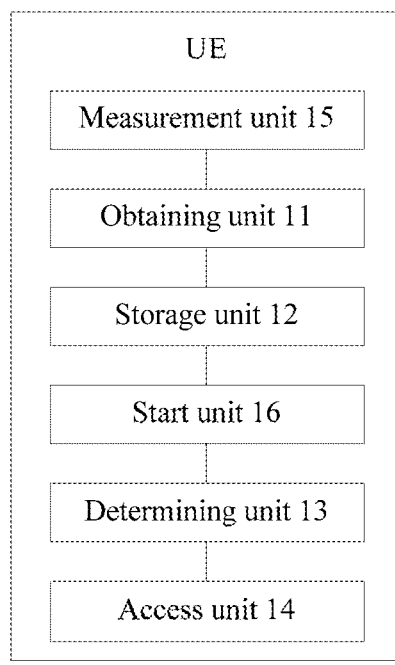
FIG. 2 is a schematic structural diagram of another UE according to an embodiment of the present invention.

In this embodiment of the present invention, further, as shown in FIG. 2, the UE may further include a measurement unit 15.

The measurement unit 15 is configured to: before the obtaining unit 11 obtains the access information for accessing a network in the first cell, measure signal quality of the first cell according to instruction information that is carried in configuration information sent by a network device, to obtain a first measurement result, where the instruction information is used to instruct to measure the signal quality of the first cell.

The obtaining unit 11 is configured to obtain the access information when the first measurement result obtained by the measurement unit 15 is greater than a preset threshold carried in the configuration information.

In this embodiment of the present invention, the obtaining unit 11 is configured to receive the access information that is sent by a network device by using a system broadcast message; or to receive the access information that is sent by a network device by using a dedicated radio resource control (RRC) message; or to receive the access information that is sent by a network device by using a paging message.

In this embodiment of the present invention, the obtaining unit 11 is configured to: before the UE is located in a current cell and when the UE was located in the first cell, receive the access information that is sent by a network device by using a system broadcast message; or before the UE is located in a current cell and when the UE was located in the first cell, to receive the access information that is sent by a network device by using a dedicated RRC message; or before the UE is located in a current cell and when the UE was located in the first cell, to receive the access information that is sent by a network device by using a paging message.

In this embodiment of the present invention, further, the measurement unit 15 is configured to: before the access unit 14 accesses a network in the first cell according to the stored access information, measure the signal quality of the first cell according to the instruction information that is carried in the configuration information sent by the network device, to obtain a second measurement result.

The determining unit 13 is further configured to determine that the second measurement result obtained by the measurement unit 15 is greater than the preset threshold carried in the configuration information.

In this embodiment of the present invention, the storage unit 12 is further configured to: after the measurement unit 15 measures the signal quality of the first cell according to the instruction information that is carried in the configuration information sent by the network device, to obtain the first measurement result, store the first measurement result.

The UE may further include a start unit 16.

The start unit 16 is configured to start a first timer, where an expiration time of the first timer indicates an effective time of the first measurement result.

The determining unit 13 is further configured to: before the access unit 14 accesses a network in the first cell according to the stored access information, determine that the first timer started by the start unit 16 has not expired.

In this embodiment of the present invention, the measurement unit 15 is configured to: when the first timer started by the start unit 16 has expired, measure again the signal quality of the first cell according to the instruction information, to obtain a third measurement result.

The access unit 14 is further configured to: when the third measurement result obtained by the measurement unit 15 is greater than the preset threshold, access a network in the first cell according to the stored access information.

In this embodiment of the present invention, the start unit 16 is configured to start a second timer after the obtaining unit 11 obtains the access information for accessing a network in the first cell and the storage unit 12 stores the access information, where an expiration time of the second timer indicates an effective time of the access information.

The access unit 14 is configured to: when the second timer started by the start unit 16 has not expired, access a network in the first cell according to the stored access information.

In this embodiment of the present invention, the access information obtained by the obtaining unit 11 includes an remaining effective time of the access information.

The access unit 14 is configured to: when the remaining effective time of the access information is not 0, access a network in the first cell according to the stored access information.

In this embodiment of the present invention, the determining unit 13 is configured to: determine that after a preamble message or a layer 3 message is sent to the network device, a response message sent by the network device is not received; or determine that after a preamble message or a layer 3 message is sent to the network device, a response denial message sent by the network device is received; or detect a radio link failure (RLF) or a handover failure (HOF) in the current cell.

In this embodiment of the present invention, further, the obtaining unit 11 is configured to obtain the access information by using an idle radio frequency (RF) resource.

In this embodiment of the present invention, the measurement unit 15 is configured to measure, according to the instruction information carried in the configuration information, the signal quality of the first cell by using an idle RF resource, to obtain the first measurement result.

The UE provided in the present invention obtains, in advance, access information for accessing a network in a related cell (a cell included in a list pre-stored on the UE), and stores the obtained access information. Therefore, when determining that accessing a network in a first cell is needed, the UE can rapidly access a network in the first cell according to the stored access information, thereby reducing a time of accessing a network again after the UE fails to access a network or detects an RLF or an HOF in a current cell, further resolving a problem of service transmission interruption, and improving user experience.

Figure 3:
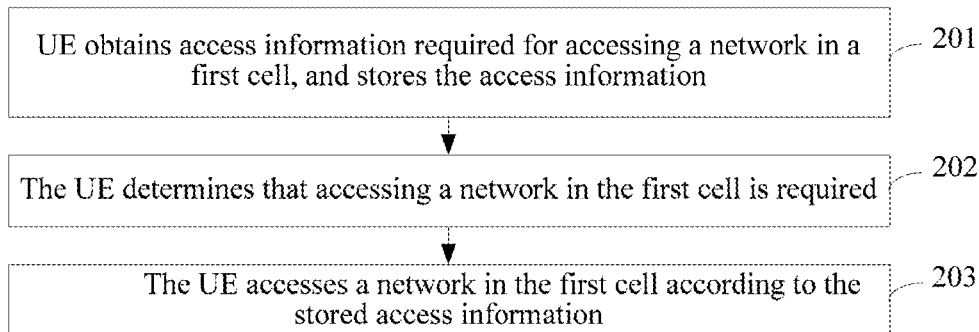
FIG. 3 is a flowchart of a network access method according to another embodiment of the present invention.

Another embodiment of the present invention provides a network access method, as shown in FIG. 3.

201: UE obtains access information for accessing a network in a first cell, and stores the access information.

The first cell is a cell included in a list pre-stored on the UE.

It should be noted that, in this embodiment of the present invention, the access information for accessing a network in the first cell may be obtained by the UE in a current cell, or may be obtained by the UE before the UE is located in a current cell and when the UE was located in another cell. Before the UE is located in the current cell, another cell in which the UE was located may be the first cell, or may be a cell other than the first cell and the current cell. This is not specifically limited in this embodiment of the present invention.

It should be noted that, in this embodiment of the present invention, a current cell and the first cell may be two intra-frequency cells, or may be two inter-frequency cells, or may be two different access sub-networks in an evolved network, or may be two macro cells, or may be two micro cells, or may be a macro cell and a micro cell. This is not specifically limited in this embodiment of the present invention.

In some embodiments, the UE may first obtain the access information for accessing a network in the first cell, and store the obtained access information, so that the UE can rapidly access a network again when the UE fails to access a network or detects an RLF or an HOF in the current cell.

202: The UE determines that accessing a network in the first cell is needed.

In a first possible implementation of this embodiment of the present invention, if the UE determines that after a preamble message or a layer 3 message is sent to a network device, a response message sent by the network device is not received, the UE may determine that accessing a network in the first cell is required.

In a second possible implementation of this embodiment of the present invention, if the UE determines that after a preamble message or a layer 3 message is sent to a network device, a response denial message sent by the network device is received, the UE may determine that accessing a network in the first cell is required.

In a third possible implementation of this embodiment of the present invention, if the UE detects an RLF or an HOF in a current cell, the UE may determine that accessing a network in the first cell is required.

203: The UE accesses a network in the first cell according to the stored access information.

After the UE obtains the access information for accessing a network in the first cell, and stores the access information, the UE may determine whether accessing a network in the first cell is required. After the UE determines that accessing a network in the first cell is required, the UE accesses a network in the first cell according to the stored access information for accessing a network in the first cell.

According to the network access method provided in the present invention, UE obtains, in advance, access information for accessing a network in a related cell (a cell included in a list pre-stored on the UE), and stores the obtained access information. Therefore, when determining that accessing a network in a first cell is required, the UE can rapidly access a network in the first cell according to the stored access information, thereby reducing a time of accessing a network again after the UE fails to access a network or detects an RLF or an HOF in a current cell, further resolving a problem of service transmission interruption, and improving user experience.

In this embodiment of the present invention, before step 201 is performed, the network access method may further include: measuring, by the UE, signal quality of the first cell according to instruction information that is carried in configuration information sent by a network device, to obtain a first measurement result. The instruction information is used to instruct to measure the signal quality of the first cell.

In this case, the obtaining, by UE, access information for accessing a network in a first cell in step 201 may include: when the UE determines that the first measurement result is greater than a preset threshold carried in the configuration information, obtaining, by the UE, the access information.

In this embodiment of the present invention, the obtaining, by UE, access information for accessing a network in a first cell in step 201 may specifically include: receiving, by the UE, the access information that is sent by a network device by using a system broadcast message; or receiving, by the UE, the access information that is sent by a network device by using a dedicated RRC message; or receiving, by the UE, the access information that is sent by a network device by using a paging message. When the UE is located in a current cell or a cell other than the current cell and the first cell, the UE may obtain the access information for accessing a network in the first cell.

In this embodiment of the present invention, the obtaining, by UE, access information for accessing a network in a first cell in step 201 may include: before the UE is located in a current cell and when the UE was located in the first cell, receiving, by the UE, the access information that is sent by a network device by using a system broadcast message; or before the UE is located in a current cell and when the UE was located in the first cell, receiving, by the UE, the access information that is sent by a network device by using a dedicated RRC message; or before the UE is located in a current cell and when the UE was located in the first cell, receiving, by the UE, the access information that is sent by a network device by using a paging message.

In this embodiment of the present invention, before step 203 is performed, the network access method may further include: measuring, by the UE, the signal quality of the first cell according to the instruction information that is carried in the configuration information sent by the network device, to obtain a second measurement result; and determining that the second measurement result is greater than the preset threshold carried in the configuration information.

In this embodiment of the present invention, further, optionally, before step 201 is performed, the network access method further includes: measuring, by the UE, signal quality of the first cell according to instruction information that is carried in configuration information sent by a network device, to obtain a first measurement result; and after the measuring, by the UE, signal quality of the first cell according to instruction information that is carried in configuration information sent by a network device, to obtain a first measurement result, the network access method may further include: storing, by the UE, the first measurement result, and starting a first timer, where an expiration time of the first timer indicates an effective time of the first measurement result.

In this case, before step 203 is performed, the network access method may further include: determining, by the UE, that the first timer has not expired.

In this embodiment of the present invention, the network access method may further include: when determining that the first timer has expired, measuring again, by the UE, the signal quality of the first cell according to the instruction information, to obtain a third measurement result; and when determining that the third measurement result is greater than the preset threshold, accessing a network in the first cell according to the stored access information.

In this embodiment of the present invention, further, optionally, in a possible implementation, after step 201 is performed, the network access method may further include: starting, by the UE, a second timer, where an expiration time of the second timer indicates an effective time of the access information.

In this case, step 203 may include: when determining that the second timer has not expired, accessing, by the UE, a network in the first cell according to the stored access information.

In this embodiment of the present invention, the access information includes an remaining effective time of the access information.

In this case, step 203 may specifically include: when determining that the remaining effective time of the access information is not 0, accessing, by the UE, a network in the first cell according to the stored access information.

In this embodiment of the present invention, step 202 may specifically include: determining, by the UE, that after a preamble message or a layer 3 message is sent to the network device, a response message sent by the network device is not received; or determining, by the UE, that after a preamble message or a layer 3 message is sent to the network device, a response denial message sent by the network device is received; or detecting, by the UE, an RLF or an HOF in the current cell.

In this embodiment of the present invention, the obtaining, by UE, access information for accessing a network in a first cell in step 201 may specifically include: obtaining, by the UE, the access information by using an idle RF resource.

In this embodiment of the present invention, the measuring, by the UE, signal quality of the first cell according to instruction information that is carried in configuration information sent by a network device, to obtain a first measurement result may specifically include: measuring, by the UE according to the instruction information carried in the configuration information, the signal quality of the first cell by using the idle RF resource, to obtain the first measurement result.

For ease of understanding by a person skilled in the art, in the present disclosure, the network access method provided in the present disclosure is described in detail according to different application scenarios. For details, refer to embodiments corresponding to FIG. 4 and FIG. 5.

Figure 4:
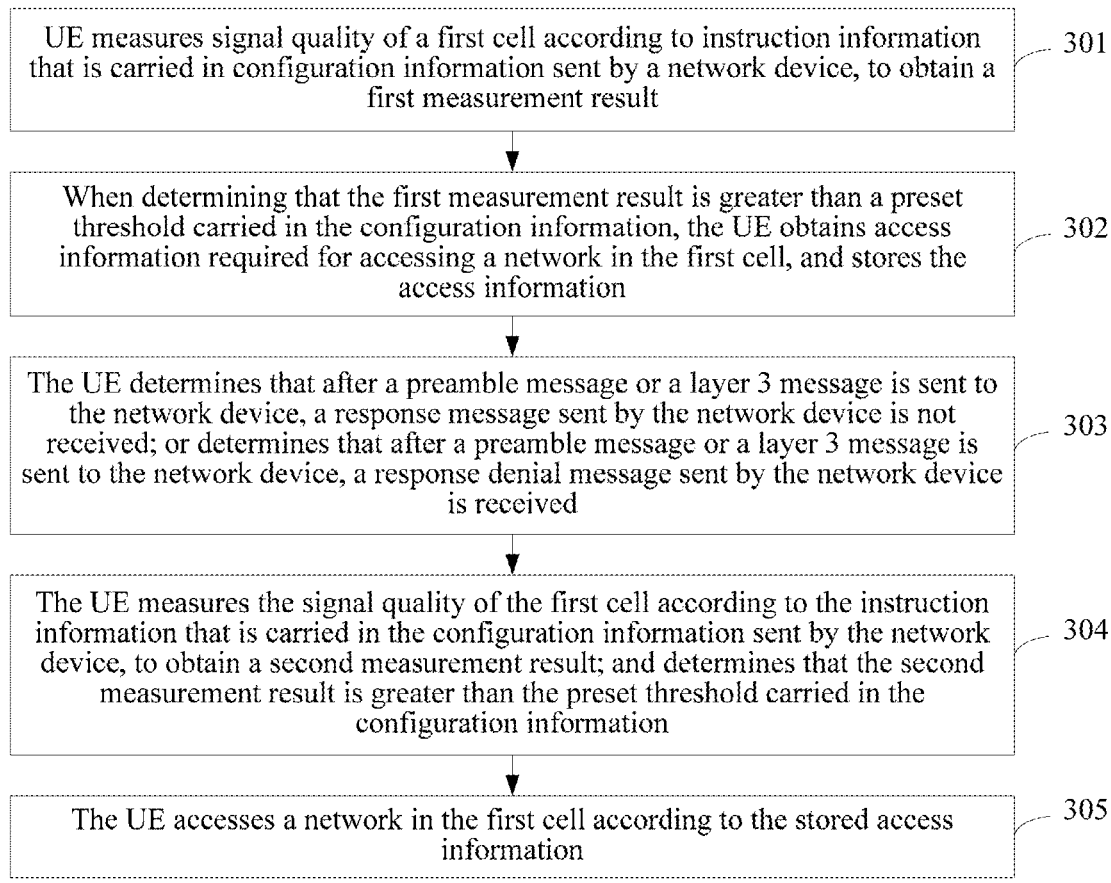
FIG. 4 is a flowchart of a network access method according to another embodiment of the present invention.

Another embodiment of the present invention provides a network access method, as shown in FIG. 4. UE needs to communicate, in a current camped-on cell, with a network device, but the UE cannot successfully access a network in the current camped-on cell because PRACH resources are strained, or dedicated resources are strained, or network load is relatively high. In this scenario, the network access method may include the following steps.

301: The UE measures signal quality of a first cell according to instruction information that is carried in configuration information sent by the network device, to obtain a first measurement result.

The instruction information that is carried in the configuration information sent by the network device is for measuring the signal quality of the first cell. The first cell is a cell included in a list pre-stored on the UE.

The network device may send the configuration information to the UE by using a system broadcast message or a dedicated message, so that the UE can rapidly access a network again when failing to access a network. The configuration information may carry the instruction information for measuring the signal quality of the first cell and a preset threshold used to determine whether a measurement result meets a condition. In this case, when the UE is in an idle state, the UE may measure signal quality of the cell included in the list pre-stored on the UE. That is, the first cell according to the instruction information that is carried in the configuration information sent by the network device, to obtain the first measurement result.

302: When determining that the first measurement result is greater than a preset threshold carried in the configuration information, the UE obtains access information for accessing a network in the first cell, and stores the access information.

After the UE measures the signal quality of the first cell according to the instruction information that is carried in the configuration information sent by the network device, to obtain the first measurement result, the UE may determine whether the obtained first measurement result is greater than the preset threshold carried in the configuration information; and when determining that the first measurement result is greater than the preset threshold carried in the configuration information, obtain the access information for accessing a network in the first cell, and store the obtained access information.

It should be noted that, in this embodiment of the present invention, the access information for accessing a network in the first cell may be obtained by the UE in a current cell, or may be obtained by the UE before the UE is located in a current cell and when the UE was located in another cell. Before the UE is located in the current cell, another cell in which the UE was located may be the first cell, or may be a cell other than the first cell and the current cell. This is not specifically limited in this embodiment of the present invention.

Optionally, when determining that the first measurement result is greater than the preset threshold carried in the configuration information, the UE may first determine whether there is valid access information for accessing a network in the first cell. When determining that there is no valid access information for accessing a network in the first cell, the UE performs operations of obtaining access information for accessing a network in the first cell, and storing the access information.

It should be noted that, in this embodiment of the present invention, the access information is information, such as a master information block (MIB) or a SIB, required for accessing a network.

In this embodiment of the present invention, before step 303 is performed, the UE may obtain the access information for accessing a network in the first cell, and store the access information by performing step 301 and step 302. In some other implementations, the UE may obtain, by using any one of the following manners, the access information for accessing a network in the first cell: receiving the access information that is sent by the network device by using a system broadcast message; or receiving the access information that is sent by the network device by using a dedicated RRC message; or receiving the access information that is sent by the network device by using a paging message, and store the access information after obtaining the access information for accessing a network in the first cell; and continue to perform the following step 303. In still another possible implementation, the UE may obtain, by using any one of the following manners, the access information for accessing a network in the first cell: before the UE is located in a current cell and when the UE was located in the first cell, receiving the access information that is sent by the network device by using a system broadcast message; or before the UE is located in a current cell and when the UE was located in the first cell, receiving the access information that is sent by the network device by using a dedicated RRC message; or before the UE is located in a current cell and when the UE was located in the first cell, receiving the access information that is sent by the network device by using a paging message, and store the access information after obtaining the access information for accessing a network in the first cell; and continue to perform the following step 303.

303: The UE determines that after a preamble message or a layer 3 message is sent to the network device, a response message sent by the network device is not received; or determines that after a preamble message or a layer 3 message is sent to the network device, a response denial message sent by the network device is received.

When the UE needs to communicate, in the current camped-on cell, with the network device, the UE may first send a preamble message to the network device on an uplink random access channel (RACH). If PRACH resources are strained, the network device does not return a response message to the UE, or returns a response denial message to the UE. In this case, the UE cannot successfully access a network in the current camped-on cell. If PRACH resources are not strained, the network device returns a random access response message to the UE on a physical downlink shared channel (PDSCH). The random access response message includes information such as an uplink resource used by a layer 3 message. After receiving the random access response message, the UE sends the layer 3 message to the network device on a physical uplink shared channel (PUSCH) according to the information, such as the uplink resource used by the layer 3 message, included in the response message. The layer 3 message may carry an RRC connection request or another message. If dedicated resources are strained or network load is relatively high, the network device does not return a response message to the UE, or returns a response denial message to the UE. In this case, the UE cannot successfully access a network in the current camped-on cell. Therefore, after sending a preamble message or a layer 3 message to the network device, the UE may determine whether a response message sent by the network device is received, or determine whether a response denial message sent by the network device is received. When determining that after a preamble message or a layer 3 message is sent to the network device, a response message sent by the network device is not received, or determining that after a preamble message or a layer 3 message is sent to the network device, a response denial message sent by the network device is received, the UE performs the following step 304 and step 305.

304: The UE measures the signal quality of the first cell according to the instruction information that is carried in the configuration information sent by the network device, to obtain a second measurement result; and determines that the second measurement result is greater than the preset threshold carried in the configuration information.

When determining that after a preamble message or a layer 3 message is sent to the network device, a response message sent by the network device is not received, or determining that after a preamble message or a layer 3 message is sent to the network device, a response denial message sent by the network device is received, the UE may consider that accessing a network in the current camped-on cell fails. In this case, the UE needs to access a network in the cell included in the pre-stored list of the UE, that is, the first cell. Therefore, the UE may measure the signal quality of the first cell according to information that is carried in configuration information sent by the network device, to obtain the second measurement result; and determine whether the obtained second measurement result is greater than the preset threshold carried in the configuration information. If the UE determines that the second measurement result is greater than the preset threshold carried in the configuration information, the UE may perform the following step 305.

305: The UE accesses a network in the first cell according to the stored access information.

When determining that the second measurement result is greater than the preset threshold carried in the configuration information, the UE may access a network in the first cell according to the stored access information for accessing a network in the first cell.

In some embodiments, after performing step 301, the UE may store the first measurement result obtained when step 301 is performed, and start a first timer. An expiration time of the first timer indicates an effective time of the first measurement result. In this case, instead of performing step 304, the UE may determine whether the first timer has expired after performing step 303 and before performing step 305, and perform step 305 when determining that the first timer has not expired. If the UE determines that the first timer has expired, the UE may perform operations of measuring again the signal quality of the first cell according to the instruction information, to obtain a third measurement result, and when determining that the third measurement result is greater than the preset threshold, accessing a network in the first cell according to the stored access information.

In some embodiments, after performing step 302, the UE may start a second timer. An expiration time of the second timer indicates an effective time of the access information, or the access information obtained by the UE includes an remaining effective time of the access information. In addition, in a scenario in which the UE starts the second timer, step 305 may be: when determining that the second timer has not expired, accessing, by the UE, a network in the first cell according to the stored access information. In a scenario in which the access information obtained by the UE includes the remaining effective time of the access information, step 305 may be specifically: when determining that the remaining effective time of the access information is not 0, accessing, by the UE, a network in the first cell according to the stored access information.

It should be noted that, when the UE records the effective time of the access information by starting the second timer, and records an effective time of a measurement result by starting the first timer, the first timer and the second timer may be a same timer.

According to the network access method provided in the present invention, UE obtains, in advance, access information for accessing a network in a related cell (a cell included in a list pre-stored on the UE), and stores the obtained access information. Therefore, when determining that accessing a network in a first cell is needed, the UE can rapidly access a network in the first cell according to the stored access information, thereby reducing a time of accessing a network again after the UE fails to access a network, further resolving a problem of service transmission interruption, and improving user experience.

Figure 5:
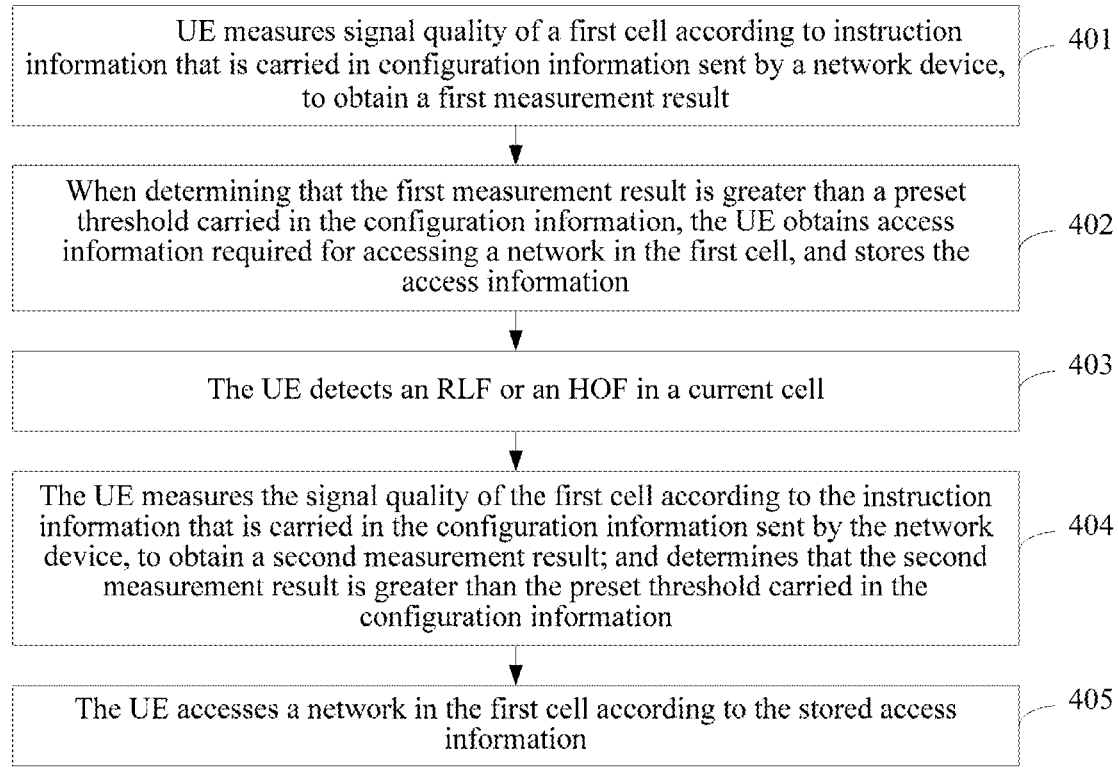
FIG. 5 is a flowchart of a network access method according to another embodiment of the present invention.

Another embodiment of the present invention provides a network access method, as shown in FIG. 5. In a process of successfully accessing a network in a current camped-on cell and performing data transmission by UE, coverage of the current camped-on cell is relatively poor, or the UE cannot receive a measurement command sent by a network device. Consequently, the UE cannot be handed over in time, causing that the UE detects an RLF or an HOF in the current cell. In this scenario, the network access method may include the following steps.

401: The UE measures signal quality of a first cell according to instruction information that is carried in configuration information sent by the network device, to obtain a first measurement result.

The instruction information that is carried in the configuration information sent by the network device is used to instruct to measure the signal quality of the first cell. The first cell is a cell included in a list pre-stored on the UE.

The network device may send the configuration information to the UE by using a system broadcast message or a dedicated message, so that the UE can rapidly access a network again to rapidly recover data transmission when detecting an RLF or an HOF in the current cell. The configuration information may carry the instruction information used to instruct to measure the signal quality of the first cell and a preset threshold used to determine whether a measurement result meets a condition. In this case, when the UE is in an idle state, the UE may measure signal quality of the cell included in the pre-stored list of the UE, that is, the first cell according to the instruction information that is carried in the configuration information sent by the network device, to obtain the first measurement result.

402: When determining that the first measurement result is greater than a preset threshold carried in the configuration information, the UE obtains access information for accessing a network in the first cell, and stores the access information.

It should be noted that, in this embodiment of the present invention, the access information for accessing a network in the first cell may be obtained by the UE in the current cell, or may be obtained by the UE before the UE is located in the current cell and when the UE was located in another cell. Before the UE is located in the current cell, the another cell in which the UE was located may be the first cell, or may be a cell other than the first cell and the current cell. This is not specifically limited in this embodiment of the present invention.

In some embodiments, when determining that the first measurement result is greater than the preset threshold carried in the configuration information, the UE may first determine whether there is valid access information for accessing a network in the first cell. When determining that there is no valid access information for accessing a network in the first cell, the UE performs operations of obtaining access information for accessing a network in the first cell, and storing the access information.

It should be noted that, in this embodiment of the present invention, the access information may be information, such as an MIB or a SIB, required for accessing a network.

In this embodiment of the present invention, before step 403 is performed, the UE may obtain the access information for accessing a network in the first cell, and store the access information by performing step 401 and step 402. In some other implementations, the UE may obtain, by using any one of the following manners, the access information for accessing a network in the first cell: receiving the access information that is sent by the network device by using a system broadcast message; or receiving the access information that is sent by the network device by using a dedicated RRC message; or receiving the access information that is sent by the network device by using a paging message, and store the access information after obtaining the access information for accessing a network in the first cell; and continue to perform the following step 403. In still another possible implementation, the UE may obtain, by using any one of the following manners, the access information for accessing a network in the first cell: before the UE is located in the current cell and when the UE was located in the first cell, receiving the access information that is sent by the network device by using a system broadcast message; or before the UE is located in the current cell and when the UE was located in the first cell, receiving the access information that is sent by the network device by using a dedicated RRC message; or before the UE is located in the current cell and when the UE was located in the first cell, receiving the access information that is sent by the network device by using a paging message, and store the access information after obtaining the access information for accessing a network in the first cell; and continue to perform the following step 403.

403: The UE detects an RLF or an HOF in the current cell.

In the process of successfully accessing a network in the current camped-on cell and performing data transmission by the UE, coverage of the current camped-on cell is relatively poor or the UE cannot be handed over in time. Consequently, an RLF or an HOF may occur. In this case, data transmission of the UE may be interrupted. Therefore, when detecting an RLF or an HOF in the current cell, the UE may perform the following step 404 and step 405, so as to access a network again, and further recover data transmission.

404: The UE measures the signal quality of the first cell according to the instruction information that is carried in the configuration information sent by the network device, to obtain a second measurement result; and determines that the second measurement result is greater than the preset threshold carried in the configuration information.

When detecting an RLF or an HOF in the current cell, the UE may consider that accessing a network in the cell included in the pre-stored list of the UE, that is, the first cell is required, to recover data transmission. In this case, the UE may measure the signal quality of the first cell according to information that is carried in the configuration information sent by the network device, to obtain the second measurement result; and determine whether the obtained second measurement result is greater than the preset threshold carried in the configuration information. If the UE determines that the second measurement result is greater than the preset threshold carried in the configuration information, the UE may perform the following step 405.

405: The UE accesses a network in the first cell according to the stored access information.

In some embodiments, after performing step 401, the UE may store the first measurement result obtained when step 401 is performed, and start a first timer. An expiration time of the first timer indicates an effective time of the first measurement result. In this case, instead of performing step 404, the UE may determine whether the first timer has expired after performing step 403 and before performing step 405, and perform step 405 when determining that the first timer has not expired. If the UE determines that the first timer has expired, the UE may perform operations of measuring again the signal quality of the first cell according to the instruction information, to obtain a third measurement result, and when determining that the third measurement result is greater than the preset threshold, accessing a network in the first cell according to the stored access information.

Optionally, after performing step 402, the UE may start a second timer. An expiration time of the second timer indicates an effective time of the access information, or the access information obtained by the UE includes an remaining effective time of the access information. In addition, in a scenario in which the UE starts the second timer, step 405 may be specifically: when determining that the second timer has not expired, accessing, by the UE, a network in the first cell according to the stored access information. In a scenario in which the access information obtained by the UE includes the remaining effective time of the access information, step 405 may be specifically: when determining that the remaining effective time of the access information is not 0, accessing, by the UE, a network in the first cell according to the stored access information.

It should be noted that, when the UE records the effective time of the access information by starting the second timer, and records an effective time of a measurement result by starting the first timer, the first timer and the second timer may be a same timer.

According to the network access method provided in the present invention, UE obtains, in advance, access information for accessing a network in a related cell (a cell included in a list pre-stored on the UE), and stores the obtained access information. Therefore, when determining that accessing a network in a first cell is required, the UE can rapidly access a network in the first cell according to the stored access information, thereby reducing a time of accessing a network again after the UE detects an RLF or an HOF in a current cell, further resolving a problem of service transmission interruption, and improving user experience.

Figure 6:
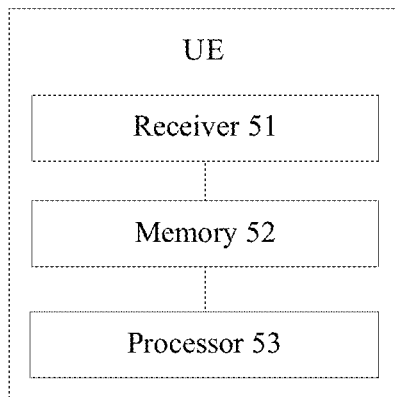
FIG. 6 is a schematic structural diagram of UE according to another embodiment of the present invention.

Another embodiment of the present invention provides UE. As shown in FIG. 6, the UE may include a receiver 51, a memory 52, and a processor 53.

The receiver 51 is configured to receive access information for accessing a network in a first cell, where the first cell is a cell included in a list pre-stored on the UE.

The memory 52 is configured to store the access information received by the receiver 51.

The processor 53 is configured to determine that accessing a network in the first cell is required, and access a network in the first cell according to the access information stored in the memory 52.

In this embodiment of the present invention, further, the processor 53 is further configured to: before the receiver 51 receives the access information for accessing a network in the first cell, measure signal quality of the first cell according to instruction information that is carried in configuration information sent by a network device, to obtain a first measurement result, where the instruction information is used to instruct to measure the signal quality of the first cell.

The receiver 51 is specifically configured to receive the access information when the first measurement result is greater than a preset threshold carried in the configuration information.

In this embodiment of the present invention, further, the receiver 51 is specifically configured to receive the access information that is sent by a network device by using a system broadcast message; or receive the access information that is sent by a network device by using a dedicated radio resource control (RRC) message; or receive the access information that is sent by a network device by using a paging message.

In this embodiment of the present invention, further, the receiver 51 is specifically configured to: before the UE is located in a current cell and when the UE was located in the first cell, receive the access information that is sent by a network device by using a system broadcast message; or before the UE is located in a current cell and when the UE was located in the first cell, receive the access information that is sent by a network device by using a dedicated RRC message; or before the UE is located in a current cell and when the UE was located in the first cell, receive the access information that is sent by a network device by using a paging message.

In this embodiment of the present invention, further, the processor 53 is further configured to: before accessing a network in the first cell according to the stored access information, measure the signal quality of the first cell according to the instruction information that is carried in the configuration information sent by the network device, to obtain a second measurement result; and determine that the second measurement result is greater than the preset threshold carried in the configuration information.

In this embodiment of the present invention, further, the memory 52 is further configured to: after the processor 53 measures the signal quality of the first cell according to the instruction information that is carried in the configuration information sent by the network device, to obtain the first measurement result, store the first measurement result.

The processor 53 is further configured to: start a first timer, where an expiration time of the first timer indicates an effective time of the first measurement result; and, before accessing a network in the first cell according to the stored access information, determine that the first timer has not expired.

In this embodiment of the present invention, further, the processor 53 is further configured to: when determining that the first timer has expired, measure again the signal quality of the first cell according to the instruction information, to obtain a third measurement result; and when determining that the third measurement result is greater than the preset threshold, access a network in the first cell according to the stored access information.

In this embodiment of the present invention, further, the processor 53 is further configured to start a second timer after the receiver 51 receives the access information for accessing a network in the first cell and the memory 52 stores the access information, where an expiration time of the second timer indicates an effective time of the access information.

The processor 53 is specifically configured to: when determining that the second timer has not expired, access a network in the first cell according to the stored access information.

In this embodiment of the present invention, further, the access information obtained by the processor 53 includes an remaining effective time of the access information.

The processor 53 is specifically configured to: when determining that the remaining effective time of the access information is not 0, access a network in the first cell according to the stored access information.

In this embodiment of the present invention, further, the processor 53 is specifically configured to: determine that after a preamble message or a layer 3 message is sent to the network device, a response message sent by the network device is not received; or determine that after a preamble message or a layer 3 message is sent to the network device, a response denial message sent by the network device is received; or detect a radio link failure (RLF) or a handover failure (HOF) in the current cell.

In this embodiment of the present invention, further, the processor 53 is specifically configured to obtain the access information by using an idle radio frequency (RF) resource.

In this embodiment of the present invention, further, the processor 53 is specifically configured to measure, according to the instruction information carried in the configuration information, the signal quality of the first cell by using the idle RF resource, to obtain the first measurement result.

It should be noted that, for specific working processes of functional modules in the UE provided in this embodiment of the present invention, refer to specific descriptions of corresponding processes in the method embodiments, and details are not described in this embodiment of the present invention again.

The UE provided in the present invention obtains, in advance, access information for accessing a network in a related cell (a cell included in a list pre-stored on the UE), and stores the obtained access information. Therefore, when determining that accessing a network in a first cell is required, the UE can rapidly access a network in the first cell according to the stored access information, thereby reducing a time of accessing a network again after the UE fails to access a network or detects an RLF or an HOF in a current cell, further resolving a problem of service transmission interruption, and improving user experience.

The foregoing descriptions allow a person skilled in the art to understand that, for the purpose of convenient and brief description, division of the foregoing function modules is used as an example for description. During actual application, the foregoing functions can be allocated to different modules and implemented according as however desired, that is, an inner structure of an apparatus is divided into different function modules to implement all or part of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely examples of the present invention, but are not intended to limit the protection scope of the present invention. Any variation or replacement readily figured out by a person skilled in the art within the technical scope disclosed in the present invention shall fall within the protection scope of the present invention. Therefore, the scope of the present invention shall be subject to the protection scope of the claims.

What is claimed is:

1. A network access method, comprising:
measuring, by user equipment (UE), signal quality of the first cell according to instruction information that is carried in configuration information sent by a network device to obtain a first measurement result;
determining, by the UE, that the first measurement result is greater than a preset threshold carried in the configuration information;
when it is determined that the first measurement result is greater than a preset threshold carried in the configuration information, obtaining, the UE, access information being for accessing a network in a first cell, and storing the access information, wherein the first cell is a cell in a list pre-stored on the UE,
determining, by the UE, that the network in the first cell is to be accessed; and
accessing, by the UE, the network in the first cell according to the stored access information.

2. The method according to claim 1, wherein after the measuring, by the UE, the signal quality of the first cell, the method further comprises:
storing, by the UE, the first measurement result, and starting a first timer, wherein an expiration time of the first timer indicates an effective time of the first measurement result; and
before the accessing, by the UE, the network in the first cell according to the stored access information, the method further comprises:
determining, by the UE, that the first timer has not expired.

3. The method according to claim 2, further comprising:
when determining that the first timer has expired, measuring again, by the UE, the signal quality of the first cell according to the instruction information, to obtain a third measurement result; and when determining that the third measurement result is greater than the preset threshold, accessing the network in the first cell according to the stored access information.

4. The method according to claim 1, wherein before the accessing, by the UE, the network in the first cell according to the stored access information, the method further comprises:
measuring, by the UE, signal quality of the first cell according to instruction information that is carried in configuration information sent by a network device to obtain a second measurement result; and
determining that the second measurement result is greater than a preset threshold carried in the configuration information.

5. The method according to claim 1, wherein after the obtaining, by the UE, the access information for accessing the network in the first cell, and storing the access information, the method further comprises:

starting, by the UE, a second timer, wherein an expiration time of the second timer indicates an effective time of the access information; and the accessing, by the UE, the network in the first cell according to the stored access information comprises:
when determining that the second timer has not expired, accessing, by the UE, the network in the first cell according to the stored access information.

6. The method according to claim 1, wherein the determining, by the UE, that the network in the first cell is to be accessed comprises:
determining, by the UE, that after a preamble message or a layer 3 message is sent to a network device, a response message sent by the network device is not received; or
determining, by the UE, that after a preamble message or a layer 3 message is sent to the network device, a response denial message sent by the network device is received; or
detecting, by the UE, a radio link failure (RLF) or a handover failure (HOF) in a current cell.

7. The method according to claim 1, wherein the measuring, by the UE, the signal quality of the first cell according to the instruction information that is carried in the configuration information sent by the network device to obtain the first measurement result comprises:
measuring, by the UE, according to the instruction information carried in the configuration information, the signal quality of the first cell by using an idle RF resource to obtain the first measurement result.

8. An apparatus, comprising:
a receiver configured to receive access information comprising information indicating a remaining effective time for accessing a network in a first cell, wherein the first cell is a cell in a list pre-stored on user equipment (UE);
a memory configured to store the access information received by the receiver; and
a processor configured to:
measure signal quality of the first cell according to instruction information that is carried in configuration information sent by a network device to obtain a first measurement result;
determine that the first measurement result is greater than a preset threshold carried in the configuration information;
determine that a network in the first cell is to be accessed, and
access the network in the first cell according to the access information stored in the memory when the remaining effective time is not 0; and, wherein
the receiver is configured to receive the access information when it is determined that the first measurement result is greater than a preset threshold carried in the configuration information.

9. The apparatus according to claim 8, wherein,
after the processor has measured the signal quality of the first cell according to the instruction information that is carried in the configuration information sent by the network device to obtain the first measurement result, the memory is further configured to store the first measurement result; and
wherein the processor is further configured to:
start a first timer, wherein an expiration time of the first timer indicates an effective time of the first measurement result; and before accessing a network in the first cell according to the stored access information, determine that the first timer has not expired.

10. The apparatus according to claim 9, wherein
the processor is further configured to: when determining that the first timer has expired, measure again a signal quality of the first cell according to instruction information to obtain a third measurement result; and when determining that the third measurement result is greater than a preset threshold, access a network in the first cell according to the stored access information.

11. The apparatus according to claim 8, wherein
the processor is further configured to: before accessing a network in the first cell according to the stored access information, measure the signal quality of the first cell according to instruction information that is carried in the configuration information sent by a network device, to obtain a second measurement result; and determine that the second measurement result is greater than a preset threshold carried in the configuration information.

12. The apparatus according to claim 8, wherein
the processor is further configured to start a second timer after the receiver receives the access information for accessing a network in the first cell and the memory stores the access information, wherein an expiration time of the second timer indicates an effective time of the access information; and
the processor is configured to: when determining that the second timer has not expired, access a network in the first cell according to the stored access information.

13. The apparatus according to claim 8, wherein the processor is configured to:
determine that after a preamble message or a layer 3 message is sent to a network device, a response message sent by the network device is not received; or
determine that after a preamble message or a layer 3 message is sent to the network device, a response denial message sent by the network device is received; or
detect a radio link failure (RLF) or a handover failure (HOF) a current cell.

14. The apparatus according to claim 8, wherein
the processor is configured to obtain the access information by using an idle radio frequency (RF) resource.

15. The apparatus according to claim 8, wherein
the processor is configured to measure, according to the instruction information carried in the configuration information, the signal quality of the first cell by using an idle RF resource, to obtain the first measurement result.

16. A non-transitory computer readable medium comprising computer program codes stored thereon, executable by one or more digital processors for providing system configurations, the computer program codes comprising instructions for:
measuring signal quality of the first cell according to instruction information that is carried in configuration information sent by a network device to obtain a first measurement result;
determining that the first measurement result is greater than a preset threshold carried in the configuration information;
when it is determined that the first measurement result is greater than a preset threshold carried in the configuration information, obtaining access information, and storing the access information, wherein the first cell is a cell included in a list pre-stored on user equipment;

determining that the network in the first cell is to be accessed;
and
accessing the network in the first cell according to the stored access information.

* * * * *